United States Patent
Öchsner

(10) Patent No.: US 7,424,020 B2
(45) Date of Patent: Sep. 9, 2008

(54) NETWORK NODES

(75) Inventor: Christoph Öchsner, Prosselsheim (DE)

(73) Assignee: ALCATEL, Paris (FR)

(*) Notice: Subject to any disclaimer, the term of this patent is extended or adjusted under 35 U.S.C. 154(b) by 961 days.

(21) Appl. No.: 10/262,834

(22) Filed: Oct. 3, 2002

(65) Prior Publication Data

US 2003/0067915 A1   Apr. 10, 2003

(30) Foreign Application Priority Data

Oct. 4, 2001  (DE)  .............................. 101 49 001

(51) Int. Cl.
*H04L 12/56* (2006.01)
(52) U.S. Cl. .................... 370/392; 370/401; 370/463
(58) Field of Classification Search ................. 370/463, 370/401, 402, 392
See application file for complete search history.

(56) References Cited

U.S. PATENT DOCUMENTS

| 5,742,238 | A |   | 4/1998  | Fox |   |
|---|---|---|---|---|---|
| 5,761,621 | A |   | 6/1998  | Sainton |   |
| 6,034,963 | A | * | 3/2000  | Minami et al. | 370/401 |
| 6,115,394 | A | * | 9/2000  | Balachandran et al. | 370/477 |
| 6,301,229 | B1 | * | 10/2001 | Araujo et al. | 370/252 |
| 6,408,001 | B1 | * | 6/2002  | Chuah et al. | 370/392 |
| 6,639,914 | B1 | * | 10/2003 | Choi et al. | 370/389 |
| 6,662,254 | B1 | * | 12/2003 | Tal et al. | 710/300 |
| 6,721,333 | B1 | * | 4/2004  | Milton et al. | 370/469 |
| 6,735,190 | B1 | * | 5/2004  | Chuah et al. | 370/352 |
| 6,925,092 | B1 | * | 8/2005  | Derks et al. | 370/465 |
| 2001/0007555 | A1 | * | 7/2001  | Sasagawa et al. | 370/359 |
| 2002/0029286 | A1 | * | 3/2002  | Gioquindo et al. | 709/236 |
| 2002/0073215 | A1 | * | 6/2002  | Huitema et al. | 709/230 |
| 2002/0141371 | A1 | * | 10/2002 | Hsu | 370/338 |
| 2002/0146000 | A1 | * | 10/2002 | Jonsson et al. | 370/352 |

FOREIGN PATENT DOCUMENTS

| EP | 0 685 951 A2 | 12/1995 |
|---|---|---|
| EP | 0 755 138 A2 | 1/1997 |

(Continued)

OTHER PUBLICATIONS

Wireless Application Forum: "Wireless Application Protocol Wireless Datagram Protocol (WDP) Specification", Wireless Application Protocol. Wireless Datagram Protocol Specification, 'Online! Apr. 30, 1998, pp.1-29, XP002244661.

Siemens Communication on Air: "Mobile Application Solutions based on Wireless Application (WAP)" Siemens Brochure, 'Online! 1999, pp. 1-4, XP002244149.

(Continued)

*Primary Examiner*—Min Jung
(74) *Attorney, Agent, or Firm*—Sughrue Mion, PLLC

(57) ABSTRACT

The invention relates to a process for transmission of data via a communication network to a terminal, and a network node for performance of the process. The data are transmitted to the terminal via the network node which can be connected with two or more terminals. On the network side at the network node for the transmission of data, a data stream is received which consists of useful data and protocol data. The network node removes the majority of the protocol data from the data stream received on the network side at the network node for the transmission of data and switches the remaining data stream in the direction of the terminal.

9 Claims, 2 Drawing Sheets

FOREIGN PATENT DOCUMENTS

| | | |
|---|---|---|
| EP | 1028561 A1 | 8/2000 |
| EP | 1 301 008 A3 | 4/2003 |
| GB | 2 351 874 A | 1/2001 |
| WO | WO 00/49748 | 8/2000 |

OTHER PUBLICATIONS

M. Engan et al, "IP Header Compression over PPP", Network Working Group Request for Comments, Feb. 1, 1999, pp. 1-10, XP002208082.

* cited by examiner

NETWORK NODES

The invention is bases on a priority application DE 10149001.1 which is hereby incorporated by reference.

BACKGROUND OF THE INVENTION

The invention relates to a process for transmission of data via a communication network to a terminal, and a network node which has a first interface to connect the network node with two or more terminals and with a second interface to connect the network node with a communication network.

The invention is based on the connection, common today, of computers and servers in a computer network.

The computer and server are connected together and with one or more routers by a multiple access medium. These components connected with the multiple access medium communicate with each other via an Ethernet or fast Ethernet protocol. The components are physically connected with the multiple access medium as follows: the computers and server of a spatial area are each connected with a floor switch allocated to this spatial area which is in turn connected with the other floor switches. The floor switch as such does not process the incoming data streams. It merely constitutes a coupling which ensures a galvanic connection between the components connected to it and allows easy user-friendly installation of the communication network.

The invention is now based on the object of improving the performance of a communication network.

SUMMARY OF THE INVENTION

This object is achieved by a process for transmission of data via a communication network to a terminal where in the process the data are transmitted to the terminal via a network node which can be connected with two or more terminals, and where on the network side on the network node or the transmission of data a data stream is received which consists of useful data and protocol data, wherein the network node removes the majority of the protocol data from the data stream received on the network side by the network node for transmission of data, and switches the remaining data stream in the direction of the terminal. Network node with a first interface for connecting the network node with two or more terminals and with a second interface for connecting the network node with a communication network, wherein the network node has a control unit which is designed so that it removes the majority of the protocol data from a data stream received on the network side via the second interface, which data stream consists of useful data and protocol data and is directed towards one of the terminals connected with the first interface, and switches the remaining data stream in the direction of this terminal.

The basic concept of the invention lies in the moving of protocol processing functions from the terminals into a network node located before the terminals.

This firstly gives the advantage that the network cards for the terminals need be equipped considerably more simply and reduces the load on the terminals from communication tasks. This saves costs on the terminal side. It is also advantageous that the scope of the data to be exchanged between the terminals and the network node is less than the scope of the data to be exchanged between the floor switch and the terminals. Accordingly the transmission complexity can be reduced in the network cards and in the line installations.

Further advantages arise from the centralisation in the field of network management and fault elimination.

Advantageous embodiments of the invention are described in the sub-claims.

BRIEF DESCRIPTION OF THE DRAWINGS

The invention will now be described in more detail as an example with reference to several embodiment examples and the enclosed drawings.

FIG. 1 shows a communication system with several terminals TE1 to TE6, with a communication network KN, with a router ROUT and with two network nodes FSW1 and FSW2.

The terminals TE1 to TE6 are computers or servers. Terminals TE1 to TE6 can however also be other terminals such as multimedia terminals, printers or copiers.

Figure 1:
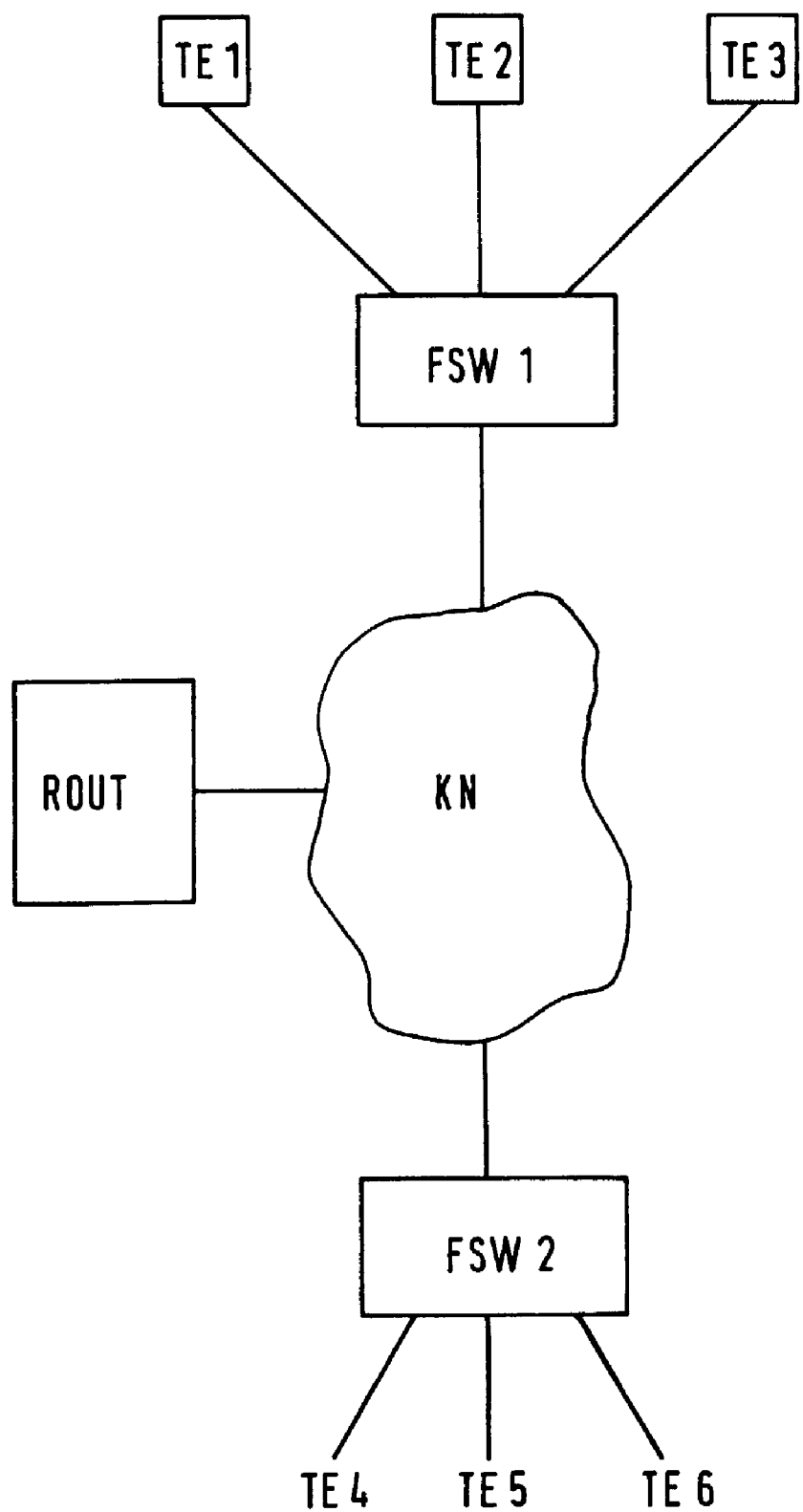
FIG. 1 shows a block circuit diagram of a communication system with two network nodes according to the invention.

Of the network nodes and routers connected to the communication network KN, FIG. 1 shows as an example the network nodes FSW1 and FSW2 and the router ROUT. It is also possible for terminals to be connected not only via the network nodes KN but also directly via the communication network KN.

The communication network KN is a communication network by means of which data can be exchanged between the components connected to the communication network. Preferably the communication network KN is a bus system. It is however also possible that the communication network KN comprises active components such as switching nodes, gateways, routers, bridges. It is also possible here that the communication network KN consists of several different part networks which use different communication protocols for data exchange or are allocated to different network operators. Such part networks can also be radio networks.

The router ROUT is a router which connects the communication network KN with one or several further communication networks. The router ROUT could also be omitted.

The network nodes FSW1 and FSW2 are connected on the network side with the communication network KN and on the terminal side with the terminals TE1 to TE3 or TE4 to TE6. The number of terminals connected with the network nodes FSW1 and FSW2 is selected as an example.

The network nodes FSW1 and FSW2 can each be connected with two or more terminals. For transmission of data via the communication network KN to one of the terminals TE1 to TE3, the data are transmitted via the network node FSW1, and for transmission of data to one of the terminals TE4 to TE6, the data are transmitted via the network node FSW2 to the relevant target terminal. Here the data are guided by the communication network KN1 to the network node FSW1 or FSW2, or the network nodes FSW1 or FSW2 take from the communication network KN the data addressed to one of the terminals TE1 to TE3 or TE4 to TE5.

On the network side, on the network nodes FSW1 and FSW2 on transmission of data a data stream is received which consists of useful data and protocol data.

The network nodes FS1 and FS2 now remove the majority of the protocol data from the data streams received on the network side at the network node for transmission of data, and pass the remaining data streams in the direction of the terminal to which the relevant data stream is addressed. Thus the protocol overhead on the terminal side from the network nodes FS1 and FS2 is reduced in relation to the network side protocol overhead.

Figure 2:
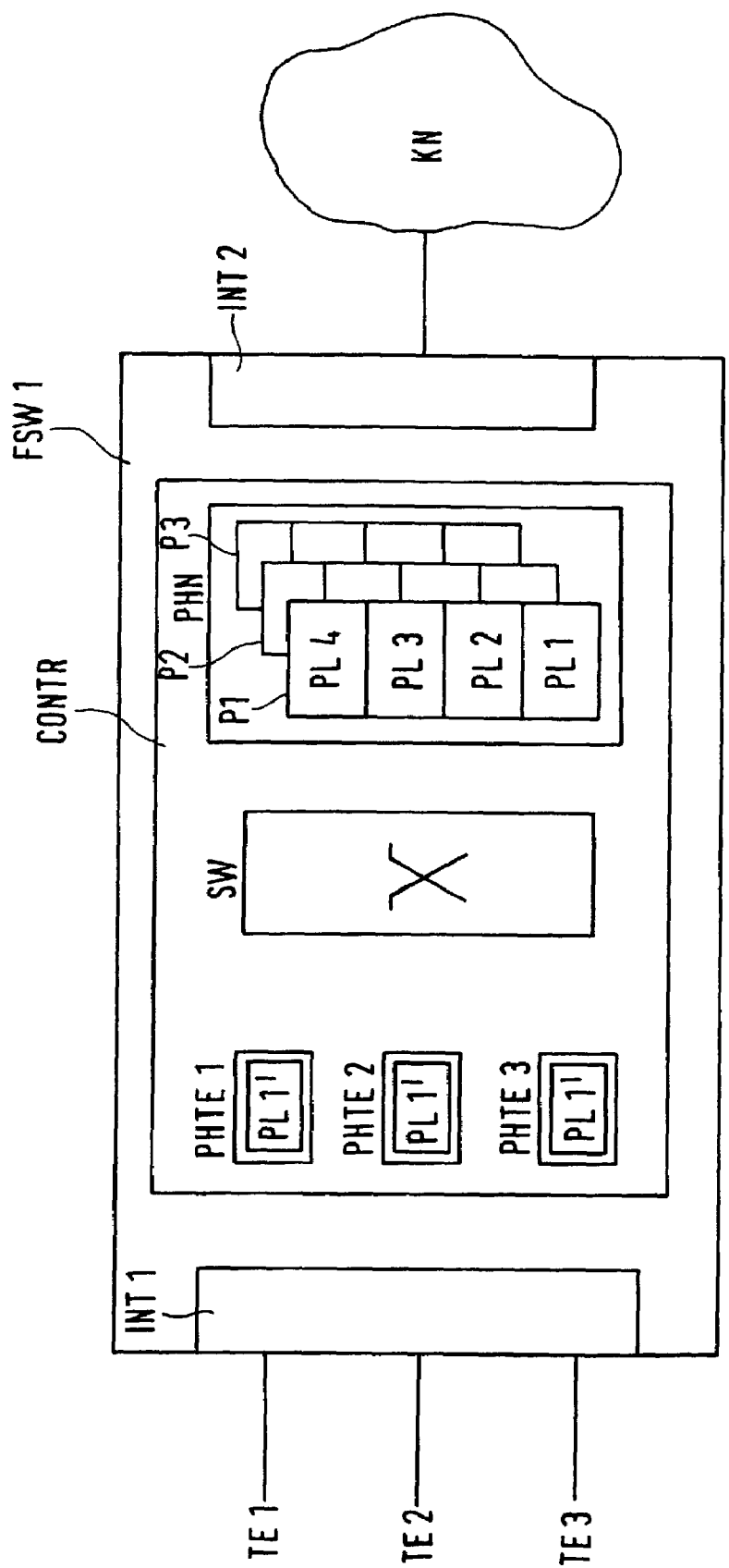
FIG. 2 shows a functional view of a network node according to FIG. 1.

The detailed function of the network nodes FSW1 and FSW2 is explained as an example below using the network node FSW1:

FIG. 2 shows the network node FSW1 which on the terminal side is connected to the terminals TE1 to TE3 and on the network side to the communication network KN.

The network node FSW1 has two interfaces INT1 and INT2 and a control unit CONTR.

The interface INT1 serves to connect the network node FSW1 with two or more terminals. It consists for example of a plug strip via which a multiplicity of connecting cables can be connected with the network node FSW1.

The interface INT2 serves to connect the network node (FSW1) with the communication network KN.

The control unit CONTR has a computer with peripheral components and a software platform sitting on this computer, which for example consists of an operating system and a database system. The control unit CONTR also has several application programs. When these application programs are run on the hardware and software platform of the control unit CONTR, the control unit CONTR performs the functions PHTE1 to PHTE3, SW and PHN described below.

The function PHN controls the network-side communication of the network node FSW1. It removes the majority of protocol data from a data stream, received on the network side via the interface INT2, which consists of useful data and protocol data and is directed towards one of the terminals connected to the interface INT1.

It is particularly advantageous here that the function PHN for the terminals connected with the network node FSW1 processes the communication protocols of one or more communication layers and removes the protocol data allocated to these communication layers.

Special advantages arise from removal of the protocol data of the first (simple point-to-point protocol) and/or the third layer (e.g. saving IP addresses). The removal of the protocol data of the fifth and higher layers brings scarcely any more savings.

Overall good results are achieved if the network nodes process the communication protocols of layers 1 to 4 for the terminals connected to them.

The function PHN comprises, in the embodiment example according to FIG. 2, several processes of which FIG. 2 shows the processes P1 to P3. The processes P1 to P3 are allocated to the terminals TE1, TE2 or TE3. The function PHN also comprises sub-functions which firstly control the "lifecycle" of the processes, i.e. generate and terminate the processes. For each terminal connected to the network node FSW1, the function PHN generates a process allocated to this terminal. The function PHN also comprises sub-functions which allocate the data stream incoming at the interface INT2 to one of the processes P1 to P3. For this the function PHN determines to which of the terminals TE1 to TE3 the data stream is directed. This is given for example by a target address in the data stream. It then transfers the processing of the data stream to the process allocated to this terminal.

Processes P1 to P3 each comprise protocol processing units for the protocol levels which are processed by the PHN function for the terminal concerned. FIG. 2 shows for example four protocol processing units PL1 to PL4 which process the communication protocols of layers 1, 2, 3 and 4. It is naturally also possible for the processes P1 to P3 to process the protocols of more or fewer layers. The layers are here oriented in relation to their task content to the OSI layer model (OSI=open system interconnection). Protocol families not specified by OSI must be classified accordingly.

For example the network node FSW1 communicates on the network side via a multiple access protocol. The protocol processing units PL1 and PL2 then process the protocol data of MAC protocols (MAC=medium access control) such as an Ethernet protocol, the DQDB protocol or a Token protocol.

The protocol processing units PL3 and PL4 then for example process the IP protocol (IP=internet protocol) or the TCP/UDP protocol (transmission control protocol, user datagram protocol).

Here it is also advantageous that one IP address is allocated to the network node FSW1 for all terminals connected to this and hence only one IP address is required for all terminals connected with the network node FSW1.

The protocol data allocated to the communication protocols processed by processors P1 to P3 are then removed from the data stream concerned by the PHN function so that only the data stream reduced by the protocol data allocated to these communication protocols is transmitted to the function SW for switching as the residual data stream.

The function SW switches the residual data stream then towards the terminal. Here it has access to the data determined by the PHN function on the target address of the data stream and passes the remaining data stream to the one of the functions PHTE1 to PHTE3 which is allocated to the target terminal.

The functions PHTE1 to PHTE3 control the terminal-side communication of the network node FSW1 with the terminals TE1, TE2 or TE3. They transmit to their allocated terminal the remaining data stream which the function SW has transmitted in the direction of this terminal.

Here it is advantageous that the protocol stack of the communication between the functions PHTE1 to PHTE3 and terminals TE1 to TE3 is as simple as possible. This ensures that the protocol overhead to be added for communication between the functions PHTE1 to PHTE3 and the terminals TE1 to TE3 is kept as small as possible.

In particular it is advantageous that the network node FSW1, on the network-side reception of the data stream, sends a data stream to one of the terminals TE1 to TE3 which consists of the useful data of the received data stream and protocol data, the scope of which is reduced by more than half in comparison with the scope of protocol data of the received data stream. This means that the reduction of protocol data by the function PHN and the addition of protocol data by the functions PHTE1 to PHTE3 complement each other so that in total the scope of the protocol data is reduced by more than 50%.

The functions PHTE1 to PHTE3 in the embodiment example each have a protocol processing unit PL1' which processes a protocol of the first communication level.

Preferably this protocol is a simple point-to-point protocol. The residual data streams are thus transmitted to the relevant terminal by means of a point-to-point protocol.

The invention claimed is:

1. A method for transmission of data via a communication network the method comprising:
    receiving, at a network node connected with two or more terminals, a data stream from the communication network, wherein the data stream comprises useful data and protocol data;
    removing, at the network node, the protocol data of a portion of protocol layers from the received data stream; and
    switching the remaining data stream to be transmitted to one of the terminals,
    wherein the communication network is a bus system, and wherein only one IP address is allocated to the network node for each of the two or more terminals connected to the network node.

2. The method according to claim 1, wherein the removing the protocol data comprises removing protocol data of communication protocols of layers 1 to 4 for the terminals connected to the network node.

3. The method according to claim 2, wherein the protocol data is structured according to an Open Systems Interconnection (OSI) model comprising the layers 1 to 4.

4. The method according to claim 1, wherein the network node communicates with the communication network via a multiple access protocol and the network node communicates with the terminals via a point-to-point protocol.

5. The method according to claim 1, wherein a scope of the protocol data of the remaining stream is reduced by more than half in comparison with a scope of the protocol data of the received data stream.

6. A network node comprising:

a first interface for connecting the network node with two or more terminals;

a second interface for connecting the network node with a communication network; and a control unit which removes protocol data from a portion of protocol layers from a data stream received from the communication network via the second interface, the data stream comprising useful data and the protocol data, and switches a remaining data stream to be transmitted to one of the terminals via the first interface, wherein the communication network is a bus system, and wherein only one IP address is allocated to the network node for each of the two or more terminals connected to the network node.

7. The network node according to claim 6, wherein the control device removes the protocol data of communication protocols of layers 1 to 4 for the terminals connected with the network node and switches the remaining data stream reduced by the protocol data of the communication protocols of the layers 1 to 4 to the terminal concerned be transmitted the one of the terminals.

8. The network node according to claim 7, wherein the protocol data is structured according to an Open Systems Interconnection (OSI) model comprising the layers 1 to 4.

9. The network node according to claim 6, wherein the control device is also configured to transmit the remaining data stream to the terminal via a point-to-point protocol.

* * * * *